US011965046B2

(12) United States Patent
Kells et al.

(10) Patent No.: US 11,965,046 B2
(45) Date of Patent: Apr. 23, 2024

(54) POLYMER LATEX FOR DIP-MOLDING APPLICATIONS

(71) Applicant: Synthomer Sdn. Bhd., Kluang (MY)

(72) Inventors: Andrew Kells, Kuala Lumpur (MY); Sören Butz, Duelmen (DE); Alexandra Abele, Duelmen (DE); Peter Shaw, Bishop's Stortford (GB); Brian Saunders, Sale (GB); Gareth Simpson, Sawston (GB)

(73) Assignee: Synthomer Sdn. Bhd., Kluang (MY)

( * ) Notice: Subject to any disclaimer, the term of this patent is extended or adjusted under 35 U.S.C. 154(b) by 669 days.

(21) Appl. No.: 16/086,775

(22) PCT Filed: Mar. 21, 2016

(86) PCT No.: PCT/MY2016/000012

§ 371 (c)(1),
(2) Date: Sep. 20, 2018

(87) PCT Pub. No.: WO2017/164726

PCT Pub. Date: Sep. 28, 2017

(65) Prior Publication Data

US 2019/0092891 A1 Mar. 28, 2019

(51) Int. Cl.

| | |
|---|---|
| ***C08F 293/00*** | (2006.01) |
| ***B29C 41/00*** | (2006.01) |
| ***B29C 41/14*** | (2006.01) |
| ***C08F 265/04*** | (2006.01) |
| ***C09D 5/02*** | (2006.01) |
| ***C09D 151/00*** | (2006.01) |
| ***C09D 153/02*** | (2006.01) |
| *B29K 105/00* | (2006.01) |
| *B29L 31/48* | (2006.01) |
| *C08F 220/18* | (2006.01) |

(52) U.S. Cl.

CPC .......... *C08F 265/04* (2013.01); *B29C 41/003* (2013.01); *B29C 41/14* (2013.01); *C08F 293/005* (2013.01); *C09D 5/022* (2013.01); *C09D 151/003* (2013.01); *C09D 153/02* (2013.01); *B29K 2105/0064* (2013.01); *B29L 2031/4864* (2013.01); *C08F 220/1804* (2020.02); *C08F 2438/00* (2013.01)

(58) Field of Classification Search

None

See application file for complete search history.

(56) References Cited

U.S. PATENT DOCUMENTS

| | | | | |
|---|---|---|---|---|
| 4,525,519 A | | 6/1985 | Leising | |
| 5,084,514 A | | 1/1992 | Szczechura et al. | |
| 5,750,618 A | | 5/1998 | Vogt et al. | |
| 6,492,446 B1 | | 12/2002 | Kajiwara et al. | |
| 6,870,019 B2 | | 3/2005 | Kajiwara et al. | |
| 8,557,934 B2 | | 10/2013 | Takeno et al. | |
| 10,982,075 B2 | * | 4/2021 | Wei | C08L 13/02 |
| 2003/0138579 A1 | * | 7/2003 | Savoca | B29C 41/42 428/36.8 |
| 2003/0175500 A1 | * | 9/2003 | Mukherjee | A61L 31/10 428/323 |
| 2006/0052513 A1 | * | 3/2006 | Butz | C08L 53/00 524/556 |

FOREIGN PATENT DOCUMENTS

| | | | | |
|---|---|---|---|---|
| EP | 0486183 A1 | | 5/1992 |
| EP | 0792891 A1 | | 9/1997 |
| EP | 1063258 A2 | * | 12/2000 |
| EP | 1215236 A2 | | 6/2002 |
| EP | 2298823 A1 | | 3/2011 |
| JP | H6248030 A | | 9/1994 |
| JP | H848705 A | | 2/1996 |
| JP | 2002220406 A | | 8/2002 |
| JP | 2005133009 A | | 5/2005 |
| JP | 2005200559 A | | 7/2005 |
| JP | 3920633 B2 | * | 5/2007 |
| WO | WO 00/11980 | * | 3/2000 |

OTHER PUBLICATIONS

"Standard Test Method for Transition Temperatures of Polymers By Differential Scanning Calorimetry", D 3418-03, 2003, ASTM International, West Conshohocken, PA.

* cited by examiner

*Primary Examiner* — Tae H Yoon

(74) *Attorney, Agent, or Firm* — The Webb Law Firm

(57) ABSTRACT

The present invention relates to a polymer latex for dip-molding applications obtainable by free-radical emulsion polymerization of a mixture of ethylenically unsaturated monomers comprising at least one conjugated diene and at least one ethylenically unsaturated nitrile compound in an aqueous medium in presence of seed latex particles having a glass transition temperature (mid point temperature Tmg) measured by DSC according to ASTM D3418-03 of −50° C. to 50° C. wherein the seed latex particles do not contain structural units derived from ethylenically unsaturated nitrile compounds, to a method of preparing said polymer latex, to articles made by using said polymer latex and to a method for preparing dip-molded articles from said polymer latex.

11 Claims, 1 Drawing Sheet

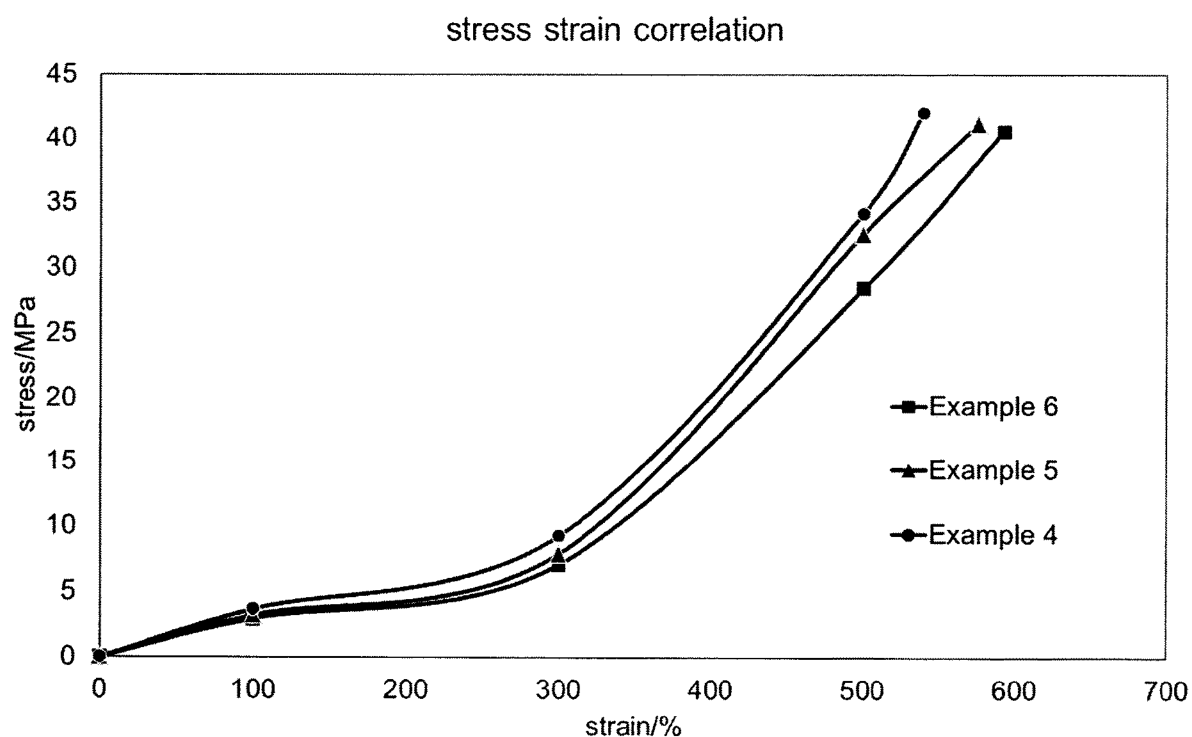
stress strain correlation
stress/MPa
strain/%
0
5
10
15
20
25
30
35
40
45
0
100
200
300
400
500
600
700
Example 6
Example 5
Example 4

POLYMER LATEX FOR DIP-MOLDING APPLICATIONS

CROSS-REFERENCE TO RELATED APPLICATION

This application is the United States national phase of International Application No. PCT/MY2016/000012 filed Mar. 21, 2016, the disclosure of which is hereby incorporated in its entirety by reference.

The present invention relates to a polymer latex obtained by free-radical emulsion polymerization wherein the emulsion polymerization is conducted in presence of seed latex particles having a glass transition temperature (midpoint temperature Tmg) measured by DSC according to ASTM D3418-03 of −50° C. to 50° C. wherein the seed latex particles do not contain structural units derived from ethylenically unsaturated nitrile compounds that is particularly suitable for the preparation of dip-molded articles, particularly gloves. Accordingly, the present invention is also related to a method for making such a polymer latex, a compounded polymer latex composition suitable for the production of dip-molded articles, to a method for making dip-molded latex films and to articles made by using the above polymer latex.

BACKGROUND OF THE INVENTION

In the art of dip-molded articles it is in general desired to achieve a high tensile strength and at the same time high elongation of the film forming the dip-molded article to provide high mechanical strength and at the same time the desired softness to the article. This is particularly important for surgical gloves. Examples of polymer latex compositions suitable for the preparation of dip-molded articles that are prepared by emulsion polymerization in presence of a seed latex are known from the prior art.

EP-A 792 891 describes in general the possibility to conduct the emulsion polymerization of ethylenically unsaturated monomers in order to produce a polymer latex suitable for dip-molding applications in presence of a seed latex. A seed latex based on styrene, and/or acrylonitrile, and/or methylmethacrylate and/or butadiene and/or vinyl carboxylic acids is disclosed. Homopolymers of styrene or butadiene or carboxylated copolymer latices on basis of styrene, methylmethacrylate and vinyl carboxylic acids are preferred. This prior art document does not provide any teaching with respect to the effect of the seed latex on the mechanical properties of the final dip-molded articles. The explicit examples do not disclose the monomers used for the seed latex employed for the preparation of the exemplified latices.

Similarly, EP-A 486 183 discloses in the examples for the production of polymer latices for dip-molding applications the use of a seed latex in the emulsion polymerization of the ethylenically unsaturated monomers without specifying the monomers used for the seed latex.

EP-A 1 063 258 and EP-A 1 215 236 relate to polymer latices for dip-molding applications employing a seed latex having a glass transition temperature in the range of −50° C. to 50° C. whereby the seed latex polymer as a mandatory requirement comprises structural units derived from ethylenically unsaturated nitrile compounds. It is particularly preferred to use acrylonitrile as ethylenically unsaturated nitrile compound. These prior art references also discuss the influence of the glass transition temperature of the seed latex on the mechanical properties of the final film made from the latex, i.e. that at a glass transition temperature lower than −50° C. the mechanical strength of the dip-molded product may be lowered, while if it exceeds 50° C., the dip-molded article may give stiff feeling to the skin.

It is therefore the object of the present invention to provide a polymer latex composition for dip-molding applications that results in films that have improved softness without compromising the mechanical strength.

SUMMARY OF THE INVENTION

Surprisingly, the present inventors found that the above object can be attained by a polymer latex for dip-molding applications obtainable by free-radical emulsion polymerization of a mixture of ethylenically unsaturated monomers comprising at least one conjugated diene and at least one ethylenically unsaturated nitrile compound in an aqueous medium in presence of seed latex particles having a glass transition temperature (mid point temperature Tmg) measured by DSC according to ASTM D3418-03 of −50° C. to 50° C. wherein the seed latex particles do not contain structural units derived from ethylenically unsaturated nitrile compounds.

In a further aspect the present invention relates to a method for preparation of a polymer latex comprising polymerizing in an emulsion polymerization process a mixture of ethylenically unsaturated monomers comprising at least one conjugated diene and at least one ethylenically unsaturated nitrile compound in an aqueous medium in presence of a free-radical initiator, stabilizers and seed latex particles having a glass transition temperature (mid point temperature Tmg) measured by DSC according to ASTM D3418-03 of −50° C. to 50° C. wherein the seed latex particles do not contain structural units derived from ethylenically unsaturated nitrile compounds.

Furthermore, the present invention is directed to a curable polymer latex compound suitable for the production of dip-molded articles comprising the polymer latex composition as defined above and optionally adjuvants selected from i) sulfur and accelerators for the sulfur vulcanization;
ii) polyvalent cations;
iii) crosslinkers; and
iv combinations thereof.

According to a further aspect the present invention is directed to a method for making dip-molded latex films by (a) immersing a mold having the desired shape of the final article in a coagulant bath comprising a solution of a metal salt;
(b) removing the mold from the bath and optionally drying the mold;
(c) immersing the mold as treated in step (a) and (b) in the above defined curable polymer latex compound;
(d) removing the mold from the latex composition and optionally immersing the latex-coated mold in a water bath;
(e) optionally drying the latex-coated mold;
(f) heat treating the latex-coated mold obtained from step (d) or (e) at a temperature of 80 to 180° C.; and
(g) removing the latex article from the mold.

Further aspects of the present invention relate to:

an article made by using the polymer latex composition of the present invention; and the use of the polymer latex composition according to the present invention for the production of dip-molded articles or for coating and impregnating a substrate.

The present invention will now be explained in more detail.

BRIEF DESCRIPTION OF DRAWING

FIG. 1 is a graph of the stress strain correlation of films prepared from the lattices of Examples 4-6.

DETAILED DESCRIPTION OF THE PRESENT INVENTION

The present invention relates to a polymer latex for dip-molding applications obtainable by free-radical emulsion polymerization of at least one ethylenically unsaturated monomer in an aqueous medium in presence of seed latex particles having a glass transition temperature (mid point temperature Tmg) measured by DSC according to ASTM D3418-03 of −50° C. to 50° C. wherein the seed latex particles do not contain structural units derived from ethylenically unsaturated nitrile compounds.

The seed latex to be used according to the present invention can be prepared by any suitable free radical emulsion polymerization process known in the art. Suitable process parameters are those that will be discussed below with respect to the emulsion polymerization process of the present invention.

The unsaturated monomers to be used for the preparation of the seed latex and their relative amounts are not particularly critical as long as no ethylenically unsaturated nitrile compounds are employed and a glass transition temperature within the above defined range is obtained.

Suitable monomers for the preparation of the seed latex to be used according to the present invention can be selected from

- vinyl aromatic monomers;
- alkyl esters of ethylenically unsaturated acids;
- hydroxyalkyl esters of ethylenically unsaturated acids;
- amides of ethylenically unsaturated acids;
- ethylenically unsaturated acids;
- vinyl carboxylates;
- conjugated dienes;
- monomers having at least two ethylenically unsaturated groups; and
- combinations thereof.

Representatives of vinyl-aromatic monomers include, for example, styrene, α-methylstyrene, p-methylstyrene, t-butylstyrene and vinyltoluene. Preferably the vinyl-aromatic monomers are selected from styrene, alpha-methyl styrene and combinations thereof.

Esters of (meth)acrylic acid that can be used to prepare the seed polymers according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth) acrylate and alkoxyalkyl (meth)acrylate monomers.

In general, the preferred alkyl esters of (meth)acrylic acids may be selected from $C_1$-$C_{20}$ alkyl (meth)acrylate, preferably $C_1$-$C_{10}$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. It is particularly preferred to select the esters of (meth)acrylic acids from methyl (meth)acrylate, ethyl (meth)acrylate, propyl (meth)acrylate, butyl (meth)acrylate, 2-ethylhexyl (meth)acrylate and combinations thereof.

The hydroxy alkyl(meth)acrylate monomers which can be used to prepare the seed latex to be used according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is selected from 2-hydroxy ethyl (meth)acrylate.

Amides of ethylenically unsaturated acids that can be used for the preparation of the seed latex to be used according to the present invention include acrylamide, methacrylamide, and diacetone acrylamide. The preferred amide monomer is (meth)acrylamide.

Vinyl ester monomers which can be used to prepare the seed latex to be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester is vinyl acetate.

The ethylenically unsaturated carboxylic acid monomers suitable for the preparation of the seed latex according to the present invention include monocarboxylic acid and dicarboxylic acid monomers and monoesters of dicarboxylic acid. Carrying out the present invention, it is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. Preferably, the ethylenically unsaturated carboxylic acid monomers are selected from (meth)acrylic acid, crotonic acid, itaconic acid, maleic acid, fumaric acid and combinations thereof.

Conjugated diene monomers suitable for the preparation of the seed latex to be used according to the present invention include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1, 3-butadiene, 2-amyl-1,3-butadiene, 3, 7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene and 1,3-cyclohexadiene. 1,3-Butadiene, isoprene and combinations thereof are the preferred conjugated dienes.

Furthermore, monomers having at least two ethylenically unsaturated groups can be can be used in the preparation of the seed latex. Suitable bifunctional monomers which are capable of providing internal crosslinking and branching in the polymer (herein known as multifunctional monomers), may be selected from divinyl benzene and diacrylates and di(meth)acrylates. Examples are ethylene glycol di(meth) acrylate, hexanediol di(meth)acrylate, tripropylene glycol di(meth) acrylate, butanediol di(meth)acrylate, neopentyl glycol di(meth)acrylate, diethylene glycol di(meth)acrylate, triethylene glycol di(meth)acrylate, and dipropylene glycol di(meth)acrylate. The monomers having at least two ethylenically unsaturated groups are preferably selected from divinyl benzene 1,2-ethyleneglycol di(meth)acrylate, 1,4-butanediol di(meth)acrylate and 1,6-hexanediol di(meth) acrylate.

Preferably, the seed latex particles to be used in the present invention comprise structural units derived from

- 25 to 100 wt.-%, preferably 80 to 100 wt.-%, more preferred 80 to 99.95 wt.-% of alkyl esters of ethylenically unsaturated acids;
- 0 to 75 wt.-%, preferably 0 to 20 wt.-% of vinyl aromatic compounds;
- 0 to 10 wt.-% of amides of ethylenically unsaturated acids,
- 0 to 10 wt.-%, preferably 0.05 to 10 wt.-% of ethylenically unsaturated acids, based on the total weight of monomers constituting the seed latex particles.

More preferred, the seed latex particles to be used in the present invention comprise structural units derived from

- 80 to 99.95 wt.-%, preferably 95 to 99.5 wt.-% of alkyl esters of ethylenically unsaturated acids, preferably a combination of 2 or more alkyl esters of ethylenically unsaturated acids, particularly butyl acrylate and methyl methacrylate;
- 0.05 to 10 wt.-%, preferably 0.5 to 5 wt.-%, more preferred 0.5 to 2 wt.-% of ethylenically unsaturated acids, particularly (meth)acrylic acid, based on the total weight of monomers constituting the seed latex particles.

The Tmg of the seed latex particles is −50° to 50° C., preferably −40° C. to 40° C., more preferably −30° C. to 30° C., more preferred −25° C. to 25° C. and most preferred −22° C. to 22° C. Thus, the lower limit of the Tmg range may be −50, −45, −40, −38, −36, −34, −32, −30, −29, −28, −27, −26, −25, −24, −23, or −22° C. The upper limit of the Tmg range may be 50, 45, 40, 38, 36, 34, 32, 30, 29, 28, 27, 26, 25, 24, 23, or 22° C. A person skilled in the art will understand that any range formed by any of the explicitly disclosed lower limits and upper limits is explicitly encompassed in the present specification.

In the emulsion polymerization for preparing the polymer latex of the present invention the seed latex particles are preferably present in an amount of 0.01 to 10, preferably 1 to 5 parts by weight based on 100 parts by weight of total ethylenically unsaturated monomers employed in the emulsion polymerization.

The lower limit of the amount of seed latex particles therefore can be 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 parts by weight based on 100 parts by weight of total ethylenically unsaturated monomers employed in the emulsion polymerization. The upper limit of the amount can be 10, 9, 8, 7, 6, 5.5, 5, 4.5, 4, 3.8, 3.6, 3.4, 3.3, 3.2, 3.1 or 3 parts by weight based on 100 parts by weight of total ethylenically unsaturated monomers employed in the emulsion polymerization. A person skilled in the art will understand that any range formed by any of the explicitly disclosed lower limits and upper limits is explicitly encompassed in the present specification.

The z-average particle size measured with a Malvern zetasizer nano S (ZEN 1600) using dynamic light scattering (DLS) of the seed latex particles preferably is 10 to 90 nm, more preferably 15 to 80 nm, more preferred 20 to 70 nm. The lower limit of the z-average particle size therefore can be 10 nm, 11 nm, 12 nm, 13 nm, 14 nm, 15 nm, 16 nm, 17 nm, 18 nm, 19 nm, or 20 nm, whereas the upper limit can be 80 nm, 75 nm, 70 nm, 65 nm, 60 nm, 55 nm, 50 nm, 45 nm, 40 nm, 38 nm, 36 nm, 34 nm, 32 nm, or 30 nm. A person skilled in the art will understand that any range formed by any of the explicitly disclosed lower limits and upper limits is explicitly encompassed in the present specification.

According to the present invention the mixture of ethylenically unsaturated monomers for preparing the polymer latex comprises

- conjugated dienes; and
- ethylenically unsaturated nitrile compounds.

In the mixture of ethylenically unsaturated monomer additional ethylenically unsaturated monomers may be present, that are selected from

- vinyl aromatic monomers;
- alkyl esters of ethylenically unsaturated acids;
- hydroxyalkyl esters of ethylenically unsaturated acids;
- amides of ethylenically unsaturated acids;
- ethylenically unsaturated acids and salts thereof;
- vinyl carboxylates;
- monomers having at least two ethylenically unsaturated groups;
- ethylenically unsaturated silanes; and
- combinations thereof.

The mixture of ethylenically unsaturated monomers to be polymerized in the free-radical emulsion polymerization according to the present invention may comprise:

- (a) 15 to 90 wt.-% of at least one aliphatic conjugated diene;
- (b) 1 to 80 wt.-% of at least one ethylenically unsaturated nitrile compound;
- (c) 0 to 10 wt.-%, preferably 0.05 to 10 wt.-% of at least one ethylenically unsaturated acid;
- (d) 0 to 40 wt.-% of at least one aromatic vinyl compound, and
- (e) 0 to 20 wt.-% of at least one further ethylenically unsaturated compound different from any of compounds (a) to (d), the weight percentages being based on the total amount of monomers.

Conjugated diene monomers suitable for the preparation of the latices according to the present invention include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, a: 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene and 1,3-cyclohexadiene. 1,3-Butadiene, isoprene and combinations thereof are the preferred conjugated dienes. 1,3-Butadiene is the most preferred diene. Typically, the amount of conjugated diene monomer ranges from 19.9 to 90 wt.-%, preferably from 25 to 85 wt.-%, more preferred from 30 to 75 wt.-%, most preferred from 40 to 70 wt.-%, based on the total weight of monomers. Thus, the conjugated diene may be present in amounts of at least 15 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers.

Accordingly, the conjugated diene monomers can be used in amounts of no more than 90 wt.-%, no more than 85 wt.-%, no more than 80 wt.-%, no more than 78 wt.-%, no more than 76 wt.-%, no more than 74 wt.-%, no more than 72 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, or no more than 56 wt.-%. A person skilled in the art will appreciate that any range between any of the explicitly disclosed lower and upper limit is herein disclosed.

Unsaturated nitrile monomers which can be used in the present invention include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being most preferred. These nitrile monomers can be included in amounts from 1 to 90 wt.-%, preferably from 10 to 70 wt.-%, and more preferred from 15 to 50 wt.-%, even more preferred from 20 to 50 wt.-%, most preferred from 23 to 43 wt.-%, based on the total weight of ethylenically unsaturated monomers.

Thus, the unsaturated nitrile may be present in amounts of at least 1 wt.-%, 5 wt.-%, at least 10 wt.-%, at least 12 wt.-%, at least 14 wt.-%, at least 16 wt.-%, at least 18 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers.

Accordingly, the unsaturated nitrile monomers can be used in amounts of no more than 80 wt.-%, no more than 75 wt.-%, no more than 73 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, no more than 56 wt.-%, no more than 54 wt.-%, no more than 52 wt.-%, no more than 50 wt.-%, no more than 48 wt.-%, no more than 46 wt.-%, or no more than 44 wt.-%. A person skilled in the art will appreciate that any range between any of the explicitly disclosed lower and upper limit is herein disclosed.

The ethylenically unsaturated carboxylic acid monomers suitable for use in the present invention include monocarboxylic acid and dicarboxylic acid monomers and monoesters of dicarboxylic acid. Carrying out the present invention, it is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. (Meth)acrylic acid, crotonic acid, itaconic acid, maleic acid, fumaric acid and combinations thereof are particularly preferred.

The use of ethylenically unsaturated acid monomers is optional and influences the properties of the polymer dispersion and of the coating produced thereof. The type and the amount of these monomers are determined thereby. Typically, such an amount is from 0 to 10 wt.-%, such as from 0.05 to 10 wt.-%, particularly from 0.1 to 10 wt.-%, preferably from 0.1 to 9 wt.-%, more preferred from 0.1 to 8 wt.-%, even more preferred from 1 to 7 wt.-%, most preferred 2 to 7 wt.-%, based on the total weight of the ethylenically unsaturated monomers. Thus, the ethylenically unsaturated acid monomers may be present in amounts of at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, or at least 3 wt.-%. Likewise, the ethylenically unsaturated acid monomers may be present in amounts of no more than 10 wt.-%, no more than 9.5 wt.-%, no more than 9 wt.-%, no more than 8.5 wt.-%, no more than 8 wt.-%, no more than 7.5 wt.-%, no more than 7 wt.-%, no more than 6.5 wt.-%, no more than 6 wt.-%, no more than 5.5 wt.-%, or no more than 5 wt.-%, based on the total weight of ethylenically unsaturated monomers. A person skilled in the art will appreciate that any range defined by an explicitly disclosed lower limit and an explicitly disclosed upper limit is disclosed herewith.

Representatives of vinyl-aromatic monomers include, for example, styrene, α-methylstyrene, vinyltoluene, o-methylstyrene, p-methylstyrene, p-tert-butylstyrene, 2,4-dimethylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, vinyltoluene and vinylxylene, 2-vinylpyridine, 4-vinylpyridine and 1,1-diphenylethylenes and substituted 1,1-diphenylethylenes, 1,2-diphenylethene and substituted 1,2-diphenylethylenes. Mixtures of one or more of the vinyl-aromatic compounds may also be used. The preferred monomers are styrene and α-methylstyrene. The vinyl-aromatic compounds can be used in a range of from 0 to 40 wt.-%, preferably from 0 to 25 wt.-%, more preferred from 0 to 15 wt.-%, and most preferred from 0 to 10 wt.-%, based on the total weight of ethylenically unsaturated monomers. Thus, the vinyl-aromatic compound can be present in an amount of no more than 35 wt.-%, no more than 30 wt.-%, no more than 25 wt.-%, no more than 20 wt.-%, no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers. Vinyl-aromatic compounds may also be completely absent.

Further, the ethylenically unsaturated monomer used in the free-radical emulsion polymerization to form the polymer latex according to the present invention may include additional ethylenically unsaturated monomers that are different from the above-defined monomers a) to d). These monomers may be selected from esters of (meth)acrylic acid, vinyl esters, and amides of ethylenically unsaturated acids or ethylenically unsaturated silane compounds.

Vinyl ester monomers which can be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester monomer for use in the present invention is vinyl acetate. Typically, the vinyl ester monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers.

Examples of suitable ethylenically unsaturated silane compounds can be selected from triethoxy(vinyl)silane and 3-methacryloxypropyltrimethoxysilane. The ethylenically unsaturated silane compounds can be present in an amount of 0.05 to 5.0 wt.-%, preferably 0.3 to 2.0 wt.-%, more preferred 0.3 to 1.0 wt.-% based on the total weight of ethylenically unsaturated monomers.

Esters of (meth)acrylic acid that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth)acrylate and alkoxyalkyl (meth)acrylate monomers.

In general, the preferred alkyl esters of (meth)acrylic acids may be selected from $C_1$-$C_{10}$ alkyl (meth)acrylate, preferably $C_1$-$C_8$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Methyl (meth)acrylate, ethyl (meth)acrylate, propyl (meth) acrylate, butyl (meth)acrylate, 2-ethylhexyl (meth)acrylate and combinations thereof are preferred.

Typically, the alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers.

The hydroxy alkyl(meth)acrylate monomers which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is 2-hydroxy ethyl(meth) acrylate. Typically, hydroxy alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers.

Alkoxyalkyl (meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers.

Amides of ethylenically unsaturated acids that can be used for the preparation of the polymer latex according to the present invention include acrylamide, methacrylamide, and diacetone acrylamide. The preferred amide monomer is (meth)acrylamide. In order to introduce functional groups that are capable of self-crosslinking upon heat treatment into the polymer particles of the present invention monomers comprising N-methylol amide groups may be employed. Suitable monomers are N-methylol (meth)acrylamide, N-methoxymethyl-(meth)acrylamide, N-n-butoxy-methyl-(meth)acrylamide, N-iso-butoxy-methyl-(meth)acrylamide, N-acetoxymethyl-(meth)acrylamide, N(-2,2-dimethoxy-1-hydroxyethyl) acrylamide. Typically, amides of ethylenically unsaturated acid can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers.

Furthermore, monomers having at least two ethylenically unsaturated groups can be present in the monomer mixture for the preparation of the polymer latex of the present invention in an amount 0 to 6.0 wt.-%, preferably 0.1 to 3.5 wt.-% based on the total weight of ethylenically unsaturated monomers. Typically these monomers can be present in an amount of no more than 6 wt.-%, no more than 4 wt.-%, no more than 2 wt.-%, no more than 1 wt.-% based on the total weight of ethylenically unsaturated monomers. Suitable bifunctional monomers which are capable of providing internal crosslinking and branching in the polymer (herein known as multifunctional monomers), may be selected from divinyl benzene and diacrylates and di(meth)acrylates. Examples are ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, and dipropylene glycol di (meth)acrylate. The monomers having at least two ethylenically unsaturated groups are preferably selected from divinyl benzene, 1,2 ethyleneglycol di(meth)acrylate, 1,4-butanediol di(meth) acrylate and 1,6-hexanediol di(meth)acrylate.

According to the present invention, the mixture of ethylenically unsaturated monomers to be polymerized in the free-radical emulsion polymerization may also comprise:

(a) 15 to 90 wt.-% of isoprene;
(b) 1 to 80 wt.-% of acrylonitrile;
(c) 0 to 10 wt.-%, preferably 0.05 to 10 wt.-% of at least one ethylenically unsaturated acid;
(d) 0 to 40 wt.-% of at least one aromatic vinyl compound, and
(e) 0 to 20 wt.-% of at least one further ethylenically unsaturated compound different from any of compounds (a) to (d). The ranges for component (a) and/or (b) may be selected from the ranges for (a) conjugated dienes and (b) unsaturated nitrile as disclosed above. Likewise specific embodiments and amounts for the components (c), (d) and/or (e) may be selected from those as described above for components (c), (d) and (e).

According to the present invention, the mixture of ethylenically unsaturated monomers for the preparation of the polymer latex may be selected from:

15 to 99 wt.-%, preferably 20 to 99 wt.-% of conjugated dienes, preferably selected from butadiene, isoprene and combinations thereof, more preferred butadiene;

1 to 80 wt.-%, preferably 1 to 60 wt.-% of monomers selected from ethylenically unsaturated nitrile compounds, preferably acrylonitrile;

0 to 40 wt.-% of vinyl aromatic monomers, preferably styrene;

0 to 25 wt.-% of $C_1$ to $C_8$ alkyl (meth)acrylate;

0 to 10 wt.-%, preferably 0.05 to 10 wt.-%, more preferred 1 to 7 wt.-% of ethylenically unsaturated acids, preferably (meth)acrylic acid;

0 to 10 wt.-% of ethylenically unsaturated compounds bearing silane, sulfonate, sulfonic acid, amide and/or N-methylolamide groups, the weight percentages being based on the total monomers employed in the emulsion polymerization.

The polymer latex according to the present invention can be made by any emulsion polymerization process known by a person skilled in the art provided the seed latex and the monomer mixture as herein defined is employed. Particularly suitable is the process as described in EP-A 792 891.

The process for the preparation of the above-described polymer latex can be performed at temperatures of from 0 to 130° C., preferably of from 0 to 100° C., particularly preferably of from 5 to 70° C., very particularly preferably of from 5 to 60° C., in the presence of no or one or more emulsifiers and one or more initiators. The temperature includes all values and sub-values therebetween, especially including 5, 10, 15, 20, 25, 30, 35, 40, 45, 50, 55, 60, 65, 70, 75, 80, 85, 90, 95, 100, 105, 110, 115, 120 and 125° C.

Initiators which can be used when carrying out the present invention include water-soluble and/or oil-soluble initiators which are effective for the purposes of the polymerization. Representative initiators are well known in the technical area and include, for example: azo compounds (such as, for example, AIBN, AMBN and cyanovaleric acid) and inorganic peroxy compounds, such as hydrogen peroxide, sodium, potassium and ammonium peroxydisulfate, peroxycarbonates and peroxyborates, as well as organic peroxy compounds, such as alkyl hydroperoxides, dialkyl peroxides, acyl hydroperoxides, and diacyl peroxides, as well as esters, such as tertiary butyl perbenzoate and combinations of inorganic and organic initiators.

The initiator is used in a sufficient amount to initiate the polymerization reaction at a desired rate. In general, an amount of initiator of from 0.01 to 5, preferably of from 0.1 to 4%, by weight, based on the weight of the total polymer, is sufficient. The amount of initiator is most preferably of from 0.01 to 2% by weight, based on the total weight of the polymer. The amount of initiator includes all values and subvalues therebetween, especially including 0.01, 0.1, 0.5, 1, 1.5, 2, 2.5, 3, 4 and 4.5% by weight, based on the total weight of the polymer.

The above mentioned inorganic and organic peroxy compounds may also be used alone in combination with one or more suitable reducing agents as is well known in the art. Examples of such reducing agents which may be mentioned are sulfur dioxide, alkali metal disulfites, alkali metal and ammonium hydrogen sulfites, thiosulfates, dithionites and formaldehyde sulfoxylates, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. The quantity of the reducing agent is preferably 0.03 to 10 parts by weight per part by weight of the polymerization initiator.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 20, preferably from 0 to 10, more preferably from 0 to 5, parts by weight, based on the total weight of the monomers. The amount of surfactant includes all values and sub-values therebetween, especially including 0, 0.1, 0.5, 1, 2, 3, 4, 5, 6, 7, 8, 9, 10, 11, 12, 13, 14, 15, 16, 17, 18 and 19 parts by weight based on the total weight of the monomer. According to one embodiment of the present invention, the polymerization is conducted without using surfactants.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polyethylene glycol and gum arabic. The preferred protective colloids are carboxymethylcellulose, hydroxyethylcellulose and hydroxypropylcellulose. In general, these protective colloids are used in contents of from 0 to 10, preferably from 0 to 5, more preferably from 0 to 2 parts by weight, based on the total weight of the monomers. The amount of protective colloids includes all values and sub-values therebetween, especially including 1, 2, 3, 4, 5, 6, 7, 8 and 9 parts by weight, based on the total weight of the monomers.

The person skilled in the art will appreciate the type and amounts of monomers bearing polar functional groups, surfactants and protective colloids that are to be selected to make the polymer latex according to the present invention suitable for dip-molding applications. Thus, it is preferred that the polymer latex composition of the present invention has a certain maximum electrolyte stability determined as critical coagulation concentration of less than 30 mmol/l $CaCl_2$, preferably less than 25 mmol/l, more preferred less than 20 mmol/l, most preferred less than 10 mmol/l (determined for a total solids content of the composition of 0.1% at pH 10 and 23° C.).

If the electrolyte stability is too high, then it is difficult to coagulate the polymer latex in a dip-molding process with the result that either no continuous film of the polymer latex on the immersed mold is formed or the thickness of the resulting product is non-uniform.

It is within the routine of the person skilled in the art to appropriately adjust the electrolyte stability of a polymer latex. The electrolyte stability will depend on certain different factors, for example, amount and selection of monomers to be used for making the polymer latex, especially monomers containing polar-functional groups, as well as the selection and amount of the stabilizing system, for example, the emulsion polymerization process for making the polymer latex. The stabilizing system may contain surface-active agents and/or protective colloids.

A person skilled in the art is able, depending on the selected monomers and their relative amounts for making the polymer latex of the present invention, to adjust the stabilizing system in order to achieve an electrolyte stability according to the present invention.

Since there are so many different influences on the electrolyte stability, the adjustment is best made by trial and error experiments. But this can be easily done without any inappropriate effort using the test method for electrolyte stability, as disclosed above.

It is frequently advisable to perform the emulsion polymerization additionally in the presence of buffer substances and chelating agents. Suitable substances are, for example, alkali metal phosphates and pyrophosphates (buffer substances) and the alkali metal salts of ethylenediaminetetraacetic acid (EDTA) or hydroxyl-2-ethylenediaminetriacetic acid (HEEDTA) as chelating agents. The quantity of buffer substances and chelating agents is usually 0.001-1.0 weight percent, based on the total quantity of monomers.

Furthermore, it may be advantageous to use chain transfer agents (regulators) in emulsion polymerization. Typical agents are, for example, organic sulfur compounds, such as thioesters, 2-mercaptoethanol, 3-mercaptopropionic acid and $C_1$-$C_{12}$ alkyl mercaptans, n-dodecylmercaptan and t-dodecylmercaptan being preferred. The quantity of chain transfer agents, if present, is usually 0.05-3.0 weight percent, preferably 0.2-2.0 weight percent, based on the total weight of the used monomers.

Various other additives and ingredients can be added in order to prepare the latex composition of the present invention. Such additives include, for example: antifoams, wetting agents, thickeners, plasticizers, fillers, pigments, dispersants, optical brighteners, crosslinking agents, accelerators, antioxidants, biocides and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfate. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Zinc oxide is a suitable crosslinking agent. Titanium dioxide ($TiO_2$), calcium carbonate and clay are the fillers typically used. Known accelerators and secondary accelerators include dithiocarbamates like zinc diethyl dithiocarbamate, zinc-dibutyl dithiocarbamate, zinc dibenyl dithiocarbamate, zinc pentamethylen dithiocarbamate (ZPD), xanthates, thiurams like tetramethylthiuram monosulfide (TMTM), Tetramethylthiuram disulfide (TMTD), tetraethylthiuram disulfide (TETD), dipentamethylenethiuram hexasulfide (DPTT), and amines, such as diphenylguanidine (DPG), di-o-tolylguanidine (DOTG), o-tolylbiguanidine (OTBG).

Furthermore, it can be beneficial to introduce partial neutralization to the polymerization process. A person skilled in the art will appreciate that by appropriate selections of this parameter the necessary control can be achieved.

The polymer latex of the present invention is particularly suitable for dip-molding processes. Therefore, according to one aspect of the present invention the polymer latex is compounded to produce a curable polymer latex compound that can be directly used in dip-coating processes. To get reproducible good physical film properties, it is advisable to adjust the pH of the compounded polymer latex composition by pH modifiers to be in the range of pH 7 to 11, preferably 8 to 10, more preferred 9 to 10. The compounded polymer latex composition contains the polymer latex of the present invention, optionally the pH modifiers, preferably ammonia or alkali hydroxides and usual additives to be used in these compositions selected from antioxidants, pigments, $TiO_2$, fillers and dispersing agents.

It is possible to add conventional vulcanization systems to the compounded polymer latex composition according to the present invention to be used in dip-molding processes, such as sulfur in combination with accelerators, such as thiurams and carbamates and zinc oxide to make it curable. Alternatively or additionally, a crosslinker component, like for example, polyvalent cations or other polyfunctional organic compounds suitable to react with functional groups on the latex particles in order to achieve chemical crosslinking may be added. If the polymer latex of the present invention bears sufficient amounts of self-crosslinking groups as described above, sulfur vulcanization systems and/or cross-linkers may be totally avoided, but the polymer latex compound of the present invention is still curable to provide dip-molded articles having the required tensile properties.

In the method for making dip-molded latex articles according to the present invention first a mold having the desired shape of the final article is immersed in a coagulant bath comprising a solution of a metal salt. The coagulant is usually used as a solution in water, an alcohol or a mixture thereof. As specific examples of the coagulant the metal salts can be metal halides like calcium chloride, magnesium chloride, barium chloride, zinc chloride and aluminum chloride; metal nitrates such as calcium nitrate, barium nitrate and zinc nitrate; metal sulfates like calcium sulfate, magnesium sulfate, and aluminum sulfate; and acetic acid salts such as calcium acetate, barium acetate and zinc acetate. Most preferred are calcium chloride and calcium nitrate. The coagulant solution might contain additives to improve the wetting behavior of the former.

Thereafter the mold is removed from the bath and optionally dried. The such treated mold is then immersed in the compounded latex composition according to the present invention. Thereby a thin film of latex is coagulated on the surface of the mold. Alternatively, it is also possible to obtain the latex film by a plurality of dipping steps, particularly two dipping steps in sequence.

Thereafter the mold is removed from the latex composition and optionally immersed in a water bath in order to extract, for example, polar components from the composition and to wash the coagulated latex film.

Thereafter the latex coated mold is optionally dried at temperature below 80° C.

Finally, the latex coated mold is heat-treated at a temperature of 80-180° C. in order to obtain the desired mechanical properties for the final film product. Then the final latex film is removed from the mold. The duration of the heat treatment will depend on the temperature and is typically between 1 and 60 minutes. The higher the temperature the shorter is the required treatment time.

The final heat-treated polymer latex film has a tensile strength of at least about 7 MPa and an elongation at break of at least about 300%, preferably a tensile strength of at least about 10 MPa, an elongation at break of at least about 350%, more preferred a tensile strength of at least about 15 MPa and an elongation at break of at least about 400% and even more preferred a tensile strength of at least about 20 MPa and an elongation at break of at least about 500%. These mechanical properties were measured according to ASTM D412.

This process can be used for any latex article that can be produced by a dip-molding process known in the art.

The present invention is especially applicable for dip-molded latex articles selected from health care devices, like surgical gloves, examination gloves, condoms, catheters or all different kinds of industrial and household gloves.

Furthermore, the polymer latex of the present invention can also be used for the coating and impregnation of substrates, preferably textile substrates. Suitable products obtained thereby are textile-supported gloves.

The present invention will be further illustrated with reference to the following examples.

EXAMPLES

Example 1 (Comparative) Seed Latex A

A glass reactor fitted with reflux condenser and blade stirrer was charged with 7.3 parts by weight of sodium dodecyl benzene sulfonate dissolved in 145 parts by weight of water relative to 100 parts by weight of monomer and heated to a temperature of 85° C. 0.1 parts by weight of ammonium peroxodisulfate (5% solution in water) were added over 1 hour, followed by the addition of 0.5 parts by weight of ammonium peroxodisulfate (5% solution in water) over a period of 90 minutes. The addition of the monomers commenced 5 minutes after the addition of ammonium peroxodisulfate and the monomers were added over a period of 4 hours (95 parts by weight styrene, 5 parts by weight acrylic acid dissolved in 54 parts by weight of water). After the addition of the monomers the temperature was maintained at 85° C. The polymerization was maintained up to a conversion of 99%. The reaction mixture was cooled to room temperature and sieved through a filter screen (90 μm). The properties of the seed are summarized in table 1.

Example 2 (Comparative) Seed Latex B

The reactor was charged with 2.9 parts by weight of sodium laurylsulfate dissolved in 123 parts by weight of water relative to 100 parts by weight of monomer and heated to a temperature of 80° C. 0.23 parts by weight of ammonium peroxodisulfate (4% solution in water) were added in an aliquot addition. After 5 minutes the monomers together with 0.37 parts by weight of the alkylsulfate dissolved in 105 parts by weight water were added over a period of 2 hours (53 parts by weight of butylacrylate, 31 parts by weight of methyl methacrylate, 15 parts by weight of acrylonitrile, 1 part by weight of methacrylic acid). After the addition of the monomers the temperature was maintained at 80° C. The polymerization was maintained up to a conversion of 99%. The reaction mixture was cooled to room temperature and sieved through a filter screen (90 μm). The properties of the seed are summarized in table 1.

Example 3 Seed Latex C

The reactor was charged with 2.9 parts by weight of sodium laurylsulfate dissolved in 123 parts by weight of water relative to 100 parts by weight monomer and heated to a temperature of 80° C. 0.23 parts by weight of ammonium peroxodisulfate (4% solution in water) were added in an aliquot addition. After 5 minutes the monomers together with 0.37 parts by weight of sodium laurylsulfate dissolved in 105 parts by weight water were added over a period of 2 hours (53 parts by weight butylacrylate, 46 parts by weight methyl of methacrylate, 1 part by weight of methacrylic acid). After the addition of the monomers the temperature was maintained at 80° C. The polymerization was maintained up to a conversion of 99%. The reaction mixture was cooled to room temperature and sieved through a filter screen (90 μm). The properties of the seed are summarized in table 1.

TABLE 1

| Seed latex properties | | | |
|---|---|---|---|
| | Example 1 (comparative) Seed latex A | Example 2 (comparative) Seed latex B | Example 3 Seed latex C |
| TSC* [%] | 31 | 30 | 30 |
| Particle size [nm]** | 36 | 29 | 31 |
| Tmg DSC [° C]** | 116 | 26 | 21 |

*The samples are taken from the reactor in glass vials and immediately cooled down on ice. Then, about 1 to 2 grams of latex is distributed in droplets on an aluminum dish. This aluminum dish is charged to the Halogen Moisture Analyzer Mettler Toledo HG 53 analyzer. The drying temperature is 180° C. for about 10 minutes. The analyzer software directly provides the solids content in weight-%.

*The particle size was measured with a Malvern zetasizer nano S (ZEN 1600) using DLS. The value is the z-average size.

*** The glass transition temperature was measured according to ASTM D3418-08. Tmg is the midpoint temperature.

Example 4 (Comparative)

3 parts by weight (based on polymer solids) of seed latex A and 80 parts by weight of water (based on 100 parts by weight of monomer including the seed latex) were added to a nitrogen-purged autoclave and subsequently heated to 25° C. Then 0.01 parts by weight of tetra sodium ethylendiamine tetraacetate ($Na_4EDTA$) and 0.005 parts by weight of Bruggolite FF6 dissolved in 2 parts by weight of water were added, followed by 0.05 parts by weight of sodium dodecyl benzene sulfonate and 0.08 parts by weight of cumene hydroperoxide (CHP) dissolved in 2 parts by weight of water.

Then the monomers were added together with the t-dodecylmercaptan (tDDM) over a period of 5 hours (29.7 parts by weight of acrylonitrile, 61.3 parts by weight of butadiene, 6 parts by weight of methacrylic acid diluted with 10 parts by weight of water and 0.6 parts by weight of tDDM).

Over a period of 10 hours 2.5 parts by weight of sodium dodecyl benzene sulfonate, 0.2 parts by weight parts by weight of tetra sodium pyrophosphate and 22 parts by weight water were added. The co-activator feed of 0.13 parts by weight of Bruggolite FF6 in 8 parts by weight of water was added over 19 hours. The post activation of 0.08 parts by weight of CHP dissolved in 4 parts by weight of water was injected in two aliquots (each 50%) after 10 and 17 hours.

The temperature was maintained at 25° C. for 2 hours, cooled down to 20° C. over 1 hour, and maintained at this temperature for 13 hours. Then the temperature was increased to 30° C. over 4 hours and maintained at 30° C. The polymerization was maintained up to a conversion of 95%, resulting in a total solids content of 45%. The polymerization was short stopped by addition of 0.2 parts by weight of a 5% aqueous solution of diethylhdroxylamine.

The pH was adjusted using ammonium hydroxide to pH 7.5 and the residual monomers were removed by vacuum distillation at 60° C. 0.5 parts by weight of a Wingstay L type antioxidant (60% dispersion in water) was added to the raw latex and the pH was adjusted to 8.2 by addition of ammonium hydroxide solution.

Example 5 (Comparative)

2 parts by weight (based on polymer solids) of seed latex B and 80 parts by weight of water (based on 100 parts by weight monomer including the seed latex) were added to a nitrogen-purged autoclave and subsequently heated to 25° C. Then 0.01 parts by weight of $Na_4EDTA$ and 0.005 parts by weight of Bruggolite FF6 dissolved in 2 parts by weight of water were added, followed by 0.05 parts by weight of sodium dodecyl benzene sulfonate and 0.08 parts by weight of CHP dissolved in 2 parts by weight of water.

Then the monomers were added together with the tDDM over a period of 5 hours (30 parts by weight of acrylonitrile, 62 parts by weight of butadiene, 6 parts by weight of methacrylic acid diluted with 10 parts by weight of water and 0.6 parts by weight of tDDM).

Over a period of 10 hours 2.5 parts by weight of sodium dodecyl benzene sulfonate, 0.2 parts by weight parts by weight of tetra sodium pyrophosphate and 22 parts by weight of water were added. The co-activator feed of 0.13 parts by weight of Bruggolite FF6 in 8 parts by weight of water was added over 19 h. The post activation of 0.08 parts by weight of CHP dissolved in 4 parts by weight of water was injected in two aliquots (each 50%) after 10 and 17 hours.

The temperature was kept at 25° C. for 2 hours, cooled down to 20° C. over 1 hour and maintained at this temperature for 13 hours. Then the temperature was increased to 30° C. over 4 hours and maintained at 30° C. The polymerization was maintained up to a conversion of 95%, resulting in a total solids content of 45%. The polymerization was short stopped by addition of 0.2 parts by weight of a 5% aqueous solution of diethylhdroxylamine. The pH was adjusted by ammonium hydroxide to pH 7.5 and the residual monomers were removed by vacuum distillation at 60° C. 0.5 parts by weight of a Wingstay L type antioxidant (60% dispersion in water) was added to the raw latex and the pH was adjusted to 8.2 by addition of ammonium hydroxide solution.

Example 6

2 parts by weight (based on polymer solids) of seed latex C and 80 parts by weight of water (based on 100 parts by weight of monomer including the seed latex) were added to a nitrogen-purged autoclave and subsequently heated to 25° C. Then 0.01 parts by weight of $Na_4EDTA$ and 0.005 parts by weight of Bruggolite FF6 dissolved in 2 parts by weight of water were added, followed by 0.05 parts by weight of sodium dodecyl benzene sulfonate and 0.08 parts by weight of CHP dissolved in 2 parts by weight of water. Then the monomers were added together with the tDDM over a period of 5 hours (30 parts by weight of acrylonitrile, 62 parts by weight of butadiene, 6 parts by weight of methacrylic acid diluted with 10 parts by weight of water and 0.6 parts by weight of tDDM).

Over a period of 10 hours 2.5 parts by weight of sodium dodecyl benzene sulfonate, 0.2 parts by weight parts by weight of tetra sodium pyrophosphate and 22 parts by weight of water were added. The co-activator feed of 0.13 parts by weight of Bruggolite FF6 in 8 parts by weight of water was added over 19 hours. The post activation of 0.08 parts by weight of CHP dissolved in 4 parts by weight of water was injected in two aliquots (each 50%) after 10 and 17 hours.

The temperature was maintained at 25° C. for 2 hours, cooled down to 20° C. over 1 hour and kept for 13 hours. Then the temperature was increased to 30° C. over 4 hours and kept at 30° C. The polymerization was maintained up to a conversion of 95%, resulting in a total solids content of 45%. The polymerization was short stopped by addition of 0.2 parts by weight of a 5% aqueous solution of diethylhdroxylamine. The pH was adjusted by ammonium hydroxide to pH 7.5 and the residual monomers were removed by vacuum distillation at 60° C. 0.5 parts by weight of a Wingstay L type antioxidant (60% dispersion in water) was added to the raw latex and the pH was adjusted to 8.2 by addition of ammonium hydroxide solution.

Example 7: Film Preparation (Dipped Films) and Measuring of the Dipped Films

The raw latex of example 4 to 6 was compounded with 1 phr Zinc oxide, 0.8 phr of Sulphur and 0.7 phr of an accelerator (zinc diethyldithiocarbamate) and pH was adjusted to 10.0 by adding of a 5% potassium hydroxide solution in water. The compound was diluted to a total solid content of 18% and conditioned under continuously stirring at room temperature (25° C.) for 16 hours prior to dipping was conducted using a mold dipping machine. As mold a glove mold with textured fingers and smooth palm was used. The mold was heated to 55-60° C. and then dipped into a coagulant solution (18 wt.-% aqueous solution of calcium nitrate at 60° C.) for 1 second. The mold was then dried in the oven. Subsequently the heated mold (60° C.) was dipped into the compounded latex for 5 seconds, air dried for 1 minute and finally leached in water for 1 minute at 60° C. After leaching, the gloves cuff was beaded manually.

The mold was then dried in the oven at 90° C. for 10 minutes followed by curing at 120° C. for 20 minutes. Finally, the cured gloves were manually stripped from the mold.

The gloves prepared from the latices of examples 4 to 6 were tested for tensile properties. The results are reported in table 2.

The tensile properties of the vulcanized gloves as reported in table 2 were tested according to ASTM D412 test procedure. 6 mm dumbbell specimens were cut from gloves prepared from each latex compound; the un-aged samples were conditioned at 23±2° C. and 50±5% relative humidity for at least 24 hours prior to testing on the Hounsfield HK10KS Tensiometer fitted with H500LC extensometer.

TABLE 2

| Tensile properties | | |
|---|---|---|
| Examples | Tensile Strength (Mpa) | Elongation at Break (%) |
| Example 4 | 42.00 | 539 |
| Example 5 | 41.12 | 576 |
| Example 6 | 40.56 | 592 |

The results of the tensile testing are summarized in FIG. 1 showing the stress strain correlation of films prepared from the latices of Examples 4-6. From FIG. 1 it is evident that the film prepared from the latex comprising a softer acrylonitrile containing seed (Example 5, comparative) behaves very similar to the film prepared from the latex comprising a hard polystyrene seed (Example 4, comparative) Only at a very high stress level strain (elongation) becomes higher. In contrast thereto, the film prepared from the inventive latex (Example 6) shows a considerably higher strain (elongation) at the same stress level compared to the films prepared from the comparative examples. This is particularly pronounced at middle stress levels giving, for example, a glove prepared from the inventive latex a considerably softer feeling. Furthermore, as is evident from Table 2 and FIG. 1, all three samples give approximately the same tensile strength whereas the film made from the inventive latex provides the highest elongation at break. Thus, it has been shown that the latex of the present invention provides softer dip-molded films without compromising the mechanical strength.

The invention claimed is:

1. A method for making dip-molded articles by:

a) immersing a mold having a desired shape of a final article in a coagulant bath comprising a solution of a metal salt;

b) removing the mold from the coagulant bath and optionally drying the mold;

c) immersing the mold as treated in step a) and b) in a compounded latex composition suitable for the production of dip-molded articles comprising:

a polymer latex for dip-molding applications obtained by free-radical emulsion polymerization of a mixture of ethylenically unsaturated monomers selected from the group consisting of:

15 to 99 wt.-% of conjugated dienes;

1 to 80 wt.-% of monomers selected from ethylenically unsaturated nitrile compounds;

0 to 40 wt.-% of vinyl aromatic monomers;

0 to 25 wt.-% of C1 to C8 alkyl (meth)acrylate;

0 to 10 wt.-% of ethylenically unsaturated acids; and 0 to 10 wt.-% of ethylenically unsaturated compounds bearing silane, sulfonate, sulfonic acid, amide and/or N-methylolamide groups, the weight percentages being based on the total monomers employed in the emulsion polymerization, the mixture comprising the at least one conjugated diene and the at least one ethylenically unsaturated nitrile compound in an aqueous medium in presence of seed latex particles having a glass transition temperature (mid point temperature Tmg) measured by DSC according to ASTM D3418-03 of −40° C. to 50° C., wherein the seed latex particles do not contain structural units derived from ethylenically unsaturated nitrile compounds, wherein a z-average particle size measured with a Malvern zetasizer nano S (ZEN 1600) using dynamic light scattering of the seed latex particles is 10 to 80 nm, and wherein the polymer latex has a maximum electrolyte stability determined as critical coagulation concentration of less than 30 mmol/l calcium chloride, wherein the seed latex particles comprise structural units derived from 80 to 99.95 wt.-% of alkyl esters of ethylenically unsaturated acids, and 0.05 to 10 wt.-% of ethylenically unsaturated acids, based on the total weight of monomers constituting the seed particles; and optionally adjuvants selected from sulfur, accelerators for sulfur vulcanization, crosslinkers, polyvalent cations and combinations thereof;

d) coagulating a latex film on the surface of the mold;

e) removing the latex-coated mold from the compounded latex composition and optionally immersing the latex-coated mold in a water bath;

f) optionally drying the latex-coated mold;

g) heat treating the latex-coated mold obtained from step e) or f) at a temperature of 80° C. to 180° C.; and h) removing the latex article from the mold, wherein, after completion of steps a) through g), the latex article has an elongation break of at least 500%.

2. The method of claim 1, wherein the seed latex particles further comprise structural units derived from monomers selected from the group consisting of:

vinyl aromatic monomers;

hydroxyalkyl esters of ethylenically unsaturated acids;

amides of ethylenically unsaturated acids;

vinyl carboxylates;

conjugated dienes;

monomers having at least two ethylenically unsaturated groups; and combinations thereof.

3. The method of claim 1, wherein the seed latex particles further comprise structural units derived from:

0 to 10 wt.-% of amides of ethylenically unsaturated acids;

based on the total weight of monomers constituting the seed latex particles.

4. The method of claim 1, wherein the Tmg of the seed latex particles is −40° C. to 40° C.

5. The method of claim 1, wherein the seed latex particles are present in an amount of 0.01 to 10 by weight based on 100 parts by weight of total ethylenically unsaturated monomers employed in the emulsion polymerization.

6. The method of claim 1, wherein:

the conjugated diene is selected from the group consisting of butadiene, isoprene and combinations thereof;

the ethylenically unsaturated nitrile compound is selected from the group consisting of (meth)acrylonitrile, alpha-cyanoethyl acrylonitrile, fumaronitrile and combinations thereof; and the mixture of ethylenically unsaturated monomers optionally comprises ethylenically unsaturated monomers selected from the group consisting of:

further alkyl esters of ethylenically unsaturated acids;

hydroxyalkyl esters of ethylenically unsaturated acids;

amides of ethylenically unsaturated acids;

vinyl carboxylates; and combinations thereof.

7. The method of claim 1, further comprising preparing the polymer latex by polymerizing in an emulsion polymerization process the mixture of ethylenically unsaturated monomers comprising the at least one conjugated diene and the at least one ethylenically unsaturated nitrile compound in the aqueous medium in presence of a free-radical initiator, stabilizers and the seed latex particles.

8. An article made using the method according to claim 1.

9. The article of claim 8, being selected from the group consisting of surgical gloves, examination gloves, condoms, catheters, industrial gloves, textile-supported gloves and household gloves.

10. The method of claim 7, wherein the seed latex particles further comprise structural units derived from monomers selected from the group consisting of:

vinyl aromatic monomers;

hydroxyalkyl esters of ethylenically unsaturated acids;

amides of ethylenically unsaturated acids;

vinyl carboxylates;

conjugated dienes;

monomers having at least two ethylenically unsaturated groups; and combinations thereof.

11. The method of claim 1, wherein the alkyl esters of ethylenically unsaturated acids comprise a combination of 2 or more alkyl esters of ethylenically unsaturated acids.

* * * * *